United States Patent
Hickey

(10) Patent No.: US 6,986,173 B1
(45) Date of Patent: Jan. 17, 2006

(54) PORTABLE FOLDING TOILET SEAT FOR BACKPACKING, CAMPING AND TRAVEL

(76) Inventor: Thomas D. Hickey, 376 S. Latah, Boise, ID (US) 83705

( * ) Notice: Subject to any disclaimer, the term of this patent is extended or adjusted under 35 U.S.C. 154(b) by 0 days.

(21) Appl. No.: 11/094,686

(22) Filed: Mar. 30, 2005

(51) Int. Cl.
A47K 11/02 (2006.01)

(52) U.S. Cl. .................. 4/460; 4/483; 4/239; 4/240

(58) Field of Classification Search .............. 4/460, 4/483, 237, 239, 240
See application file for complete search history.

(56) References Cited

U.S. PATENT DOCUMENTS

| | | | | |
|---|---|---|---|---|
| 496,536 A | * | 5/1893 | Prins | 4/239 |
| 1,575,131 A | * | 3/1926 | Schumacher | 4/460 |
| 1,592,597 A | * | 7/1926 | Becker | 4/245.3 |
| 2,443,068 A | * | 6/1948 | Dahle | 4/239 |
| 3,261,030 A | * | 7/1966 | Blem et al. | 4/239 |
| 4,525,880 A | * | 7/1985 | Bass | 4/239 |
| 5,005,223 A | * | 4/1991 | Greenwood | 4/235 |
| 5,090,063 A | * | 2/1992 | Edwards et al. | 4/239 |

* cited by examiner

Primary Examiner—Justine R. Yu
Assistant Examiner—Huyen Le

(57) ABSTRACT

An ultra-light weight portable toilet seat and supporting leg assemblies for backpacking, camping and travel use, comprised of a folding seat and multiple adjustable legs for height variation. The seat is comprised of a top surface and a bottom surface, a back section and a front section, and an open center. The multiple legs attach into the bottom section and angle downward to meet the ground. The bottom section of the seat has an interior space designed to receive the adjustable legs which when fully retracted will friction fit into place by the designed form. The back section and the front section are held together by a center axis to allow the seat to close, concealing the legs in a clamshell fashion. The portable toilet assembly can be used over a pre-dug hole or with the waste container.

8 Claims, 3 Drawing Sheets

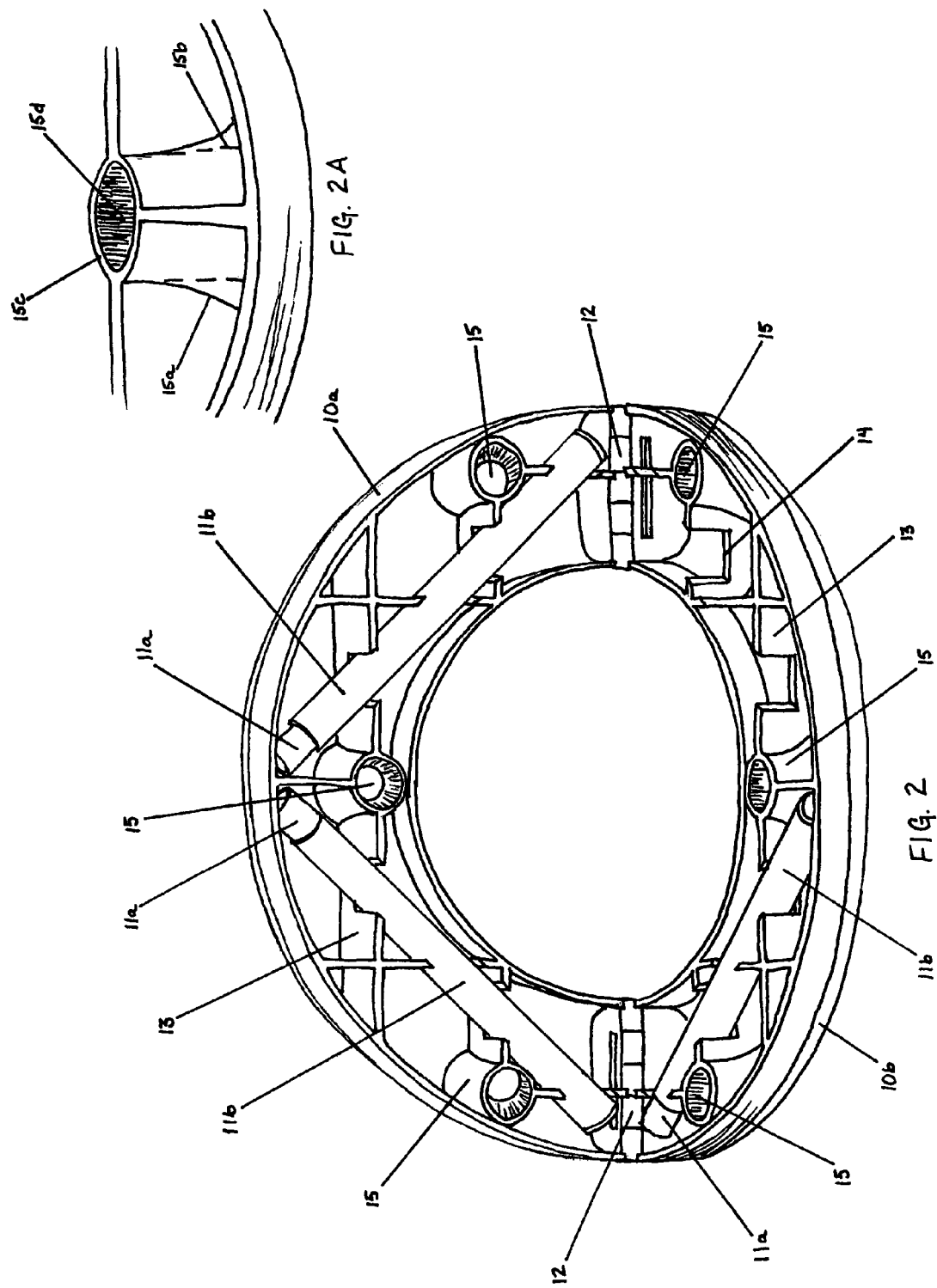

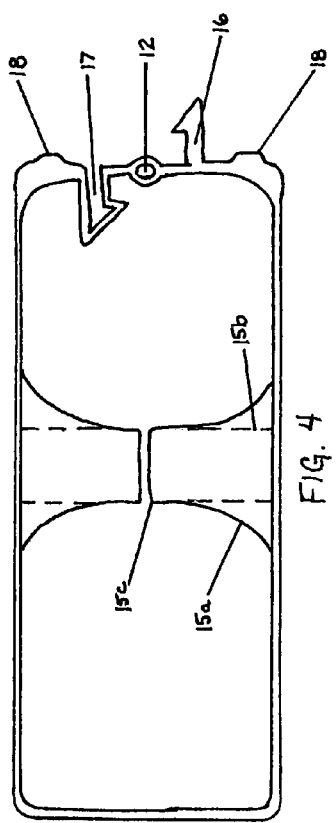
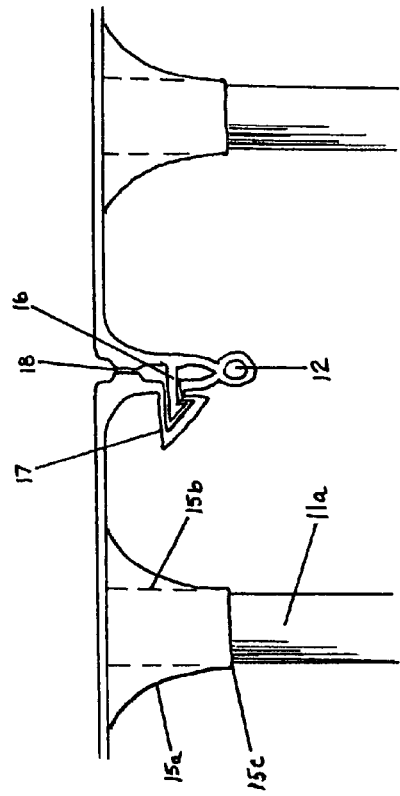
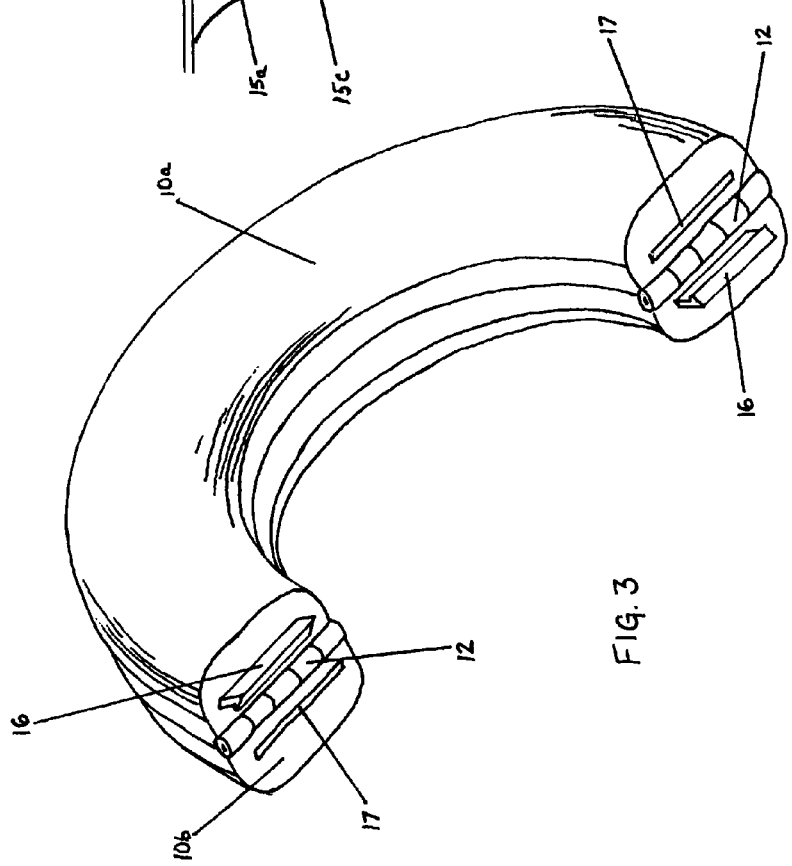

PORTABLE FOLDING TOILET SEAT FOR BACKPACKING, CAMPING AND TRAVEL

BACKGROUND OF THE INVENTION

This invention relates to an improved portable toilet seat assembly. More particularly, the invention is an ultra-light weight portable toilet seat and leg assembly that is free standing for use in the out-of-doors for backpacking, camping and travel.

A backpacking and camping experience can be an enjoyable experience, but all too often a person's need to eliminate is hindered for lack of normal bathroom facilities. The person will override the urge to eliminate and can cause sever cramping and nausea. Children are especially prone to neglect nature's call when not in the proper environment.

The improved portable toilet seat and leg assembly will be utilized by adults of various sizes and as well as small children. A toilet seat that looks and feels like the standard seat in their bathroom at home will give a backpacker and their children more comfort. They will be able to more easily eliminate and thus be able to better enjoy their backpacking experience.

Most of the prior art discusses how seats are used with standard toilets and most are concerned with sanitation situations.

U.S. Pat. No. 5,230,105 to Watson discloses a portable toilet seat and stand for wilderness campers which requires considerable assembly for use.

U.S. Pat. No. 5,090,063 to Edwards et al., discloses a portable toilet seat for use in public restrooms.

U.S. Pat. No. 4,525,880 to Bass discloses a portable and foldable toilet seat to fit over a permanent toilet seat to prevent slippage and to include a stack of disposable liners within the shell.

U.S. Pat. No. 5,00,223 to Greenwood discloses a folding toilet seat that is specifically designed for use with children.

While these inventions may be adequate and even useful for their particular uses they would not be suitable for the particular uses set forth by the present invention as disclosed hereafter.

SUMMARY OF THE INVENTION

The invention consists of a portable folding toilet seat and legs that when connected serves as a stand-alone toilet. The portable folding toilet seat conceals the legs in a clamshell fashion for easy pack-ability and storage. The ultra-light weight feature of the invention allows people to pack this toilet assembly deep into the wilderness where no bathroom facilities exist.

A primary object of this invention is to improve aspects of prior art in regards to the convenience and ease of set up, transport, assembly and future production of this portable folding toilet seat.

The seat assembly can be easily made from molded plastic and the molding process will be utilized to mold only one side of the seat assembly. The other half will be a copy of the first and will fit together by the center axis. The improvement over prior art is in this simple molding process whereby the front section of the seat is a copy of the back section so tooling cost and set up fees would be greatly reduced. By producing a carbon copy of one section and integrating it to a copy of itself over and over again a minimum amount of fasteners such as hinges, pins, slots or screws, etc. would be used further reducing the production costs.

In addition, the molded portion on the bottom surface allows the invention to be sturdy and light weight. A series of molded ribs will traverse the bottom surface of the seat to provide strength and still keep the seat light weight. The supporting molded ribs are partially carved out to form an interior storage space. The partially carved out interior storage spaces are the full length of the retracted leg assemblies and the width will be just wide enough to allow for a friction or snap fit for storage of the leg assemblies on the bottom surface of the seat. Once the leg assemblies are stored in the interior storage spaces, the user of the present invention can simple grasp the leg assembly anywhere along the entire length of the leg assembly and snap it out of the interior storage space.

Further more, the bottom surface has a plurality of molded projections extending from the bottom surface of the seat. The molded projections consist of a base, a wall, a lip and an open center. The molded projection is broader at the base and tapers as the wall extends to the lip. The lip is much narrower therefore creating a weight-reducing feature.

More specifically, the molded projections extending from the bottom surface consisting of a base, a wall a lip and an open center whereas, the wall is of sufficient length and the open center is of sufficient width to create a receptacle to receive the end of the upper leg assembly. The upper end of the leg assembly, will friction fit into the open center and will be supported by the wall of the molded projection. Once all of the leg assemblies are friction fitted in the open centers and supported by the wall, the portable folding toilet seat will be supported to be a stand-alone portable toilet.

The interior storage space of the partially carved out supporting molded ribs will store a plurality of leg assemblies. The carved out storage space will form a friction fit to allow the leg assemblies to snap into position to be stored. When the folding toilet seat is fully folded the leg assembly will be nested in the friction fit interior storage space and only the clamshell will appear.

The leg assemblies will consist of two tubes that will be able to fully retract to be stored in the interior space. The leg assembly then will be able to be snapped out of the friction fit interior space to be extended to a height for child use or fully extended for adult use.

A portable folding toilet seat with leg assemblies will become a free-standing portable toilet. Here, the invention will accept limitation of the scope by suggesting the leg assemblies be limited to and including only three legs first, for stability purposes. The rough terrain of the wilderness or camping areas will require a three leg portable toilet to be used. The inventor knows that the most stable contact for the portable toilet is three legs. Three legs will allow a more stable base on rough terrain as well as reduce the cost and weight of the portable folding toilet. I have tried to show in this paragraph that for the invention to improve on prior art, a realistic way to reduce the cost of start-up, tooling, manufacturing and assembly needs to be considered. By keeping the number of legs to three, and by the molding procedures such as the supporting molded ribs and the molded projections tapering from the base to the lip, the invention can reduce the amount of weight significantly and truly be an ultra light weight portable folding toilet.

BRIEF DESCRIPTION OF THE DRAWINGS

FIG. 2 is a perspective view of the bottom section of the partially folded seat showing the retracted legs nested into the interior space carved out of the molded ribs.

FIG. 2A is a fragmentary view of a portion of the bottom surface of the seat showing the molded projection and a portion of the supporting molded ribs.

FIG. 3 is a perspective view of the fully folded seat in a clamshell fashion.

FIG. 4 is a sectional view of a portion of the folded seat illustrating the molded extension with a small protrusion and the molded groove with a small recess.

FIG. 5 is a sectional view of a portion of the unfolded seat to illustrate the molded extension with a small protrusion and the molded groove with a small recess friction fit to lock the seat in a ridged position.

DETAILED DESCRIPTION

Figure 1:
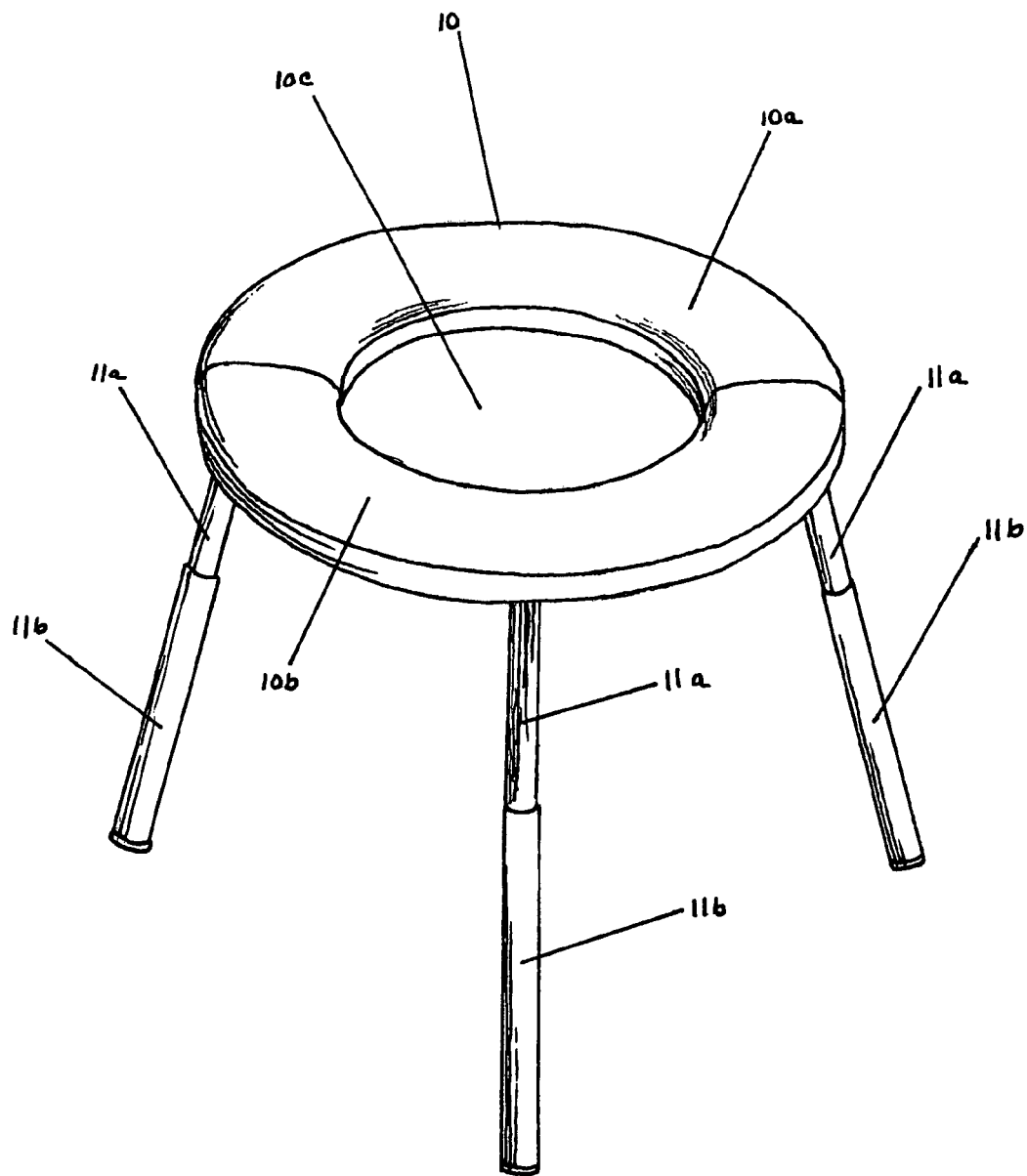
FIG. 1 is a diagrammatic perspective view of the portable folding toilet seat with adjustable legs extending downward from the bottom section.

FIG. 1 illustrates a portable folding toilet seat 10 consisting of a back section 10a and a front section 10b and an open center 10c. Connected to the bottom surface are the multiple adjusting legs 11a and 11b. When the upper portion 11a and the lower portion 11b of the adjustable legs are fully extended and placed into position on the bottom surface, it becomes a free-standing portable toilet seat. The adjustable height variations of the legs, allow adults of varying sizes and children to use the portable toilet seat.

The portable folding toilet seat 10, oval in shape, uses a molded center axis 12 to allow the front and back sections to pivot open and closed as shown in FIG. 2. The portable toilet seat 10 pivots at the center molded axis 12. The bottom surface contains an intricate series of supporting molded ribs 13, which gives the folding seat strength while reducing weight. These supporting molded ribs 13 are partially carved out to form interior spaces 14, to allow the fully retracted leg assemblies 11a and 11b to friction fit or snap into these interior spaces 14. The upper portion 11a and the lower portion 11b of the adjustable leg assembly retract to nest in the interior spaces 14 of the bottom of the seat 10.

Also contained on the bottom surface of the seat are a plurality of molded projections 15 extending from the bottom surface. The molded projections 15 are viewed in FIG. 2A, consisting of a base 15a, a wall 15b, a lip 15c and an open center 15d are so designed to be tapered with a wider base 15a to a narrower lip 15c which will give strength to the base 15a and wall 15b still allowing adequate strength to the lip 15c, while reducing weight to the seat 10. The openings of the molded projections 15 are of sufficient width to receive the upper portion 11a of the leg assembly using a friction fit. A friction fit is used here to enable the user to insert or pull out the upper portion 11a of the leg assembly with ease. The molded projections 15 are oriented outward at an angle from the open center 10c to broaden the contact base where the lower portion 11b meets the ground. Once all of the upper portions 11a of the leg assemblies are friction fit into the open centers 15d and supported by the wall 15b of the molded projections 15, the portable folding toilet seat 10 will be supported to be a free standing portable toilet.

FIG. 3 shows the portable folding toilet seat folded in a clamshell configuration. As noted from FIG. 2 the bottom surface of the seat 10 comprises an intricate series of molded ribs 13, the partially carved out molded ribs referred to as interior spaces 14, the molded projections 15 extending from the bottom surface and the upper and lower portions 11a and 11b of the leg assemblies are all concealed in the clamshell. The folded seat exposes the center axis 13 and on either side of the center axis 13, the molded extension with the small protrusion at the end of the extension 16 and the molded groove with a small recess 17. FIG. 4 better illustrates the molded extension with a small protrusion at the end of the extension 16 and the molded groove with a small recess 17. This view is a sectional view as seen from the side of the folded seat 10. This view also shows the molded projections 15 extending from the bottom surface. The tapered base 15a and supporting wall 15b are seen here. The lips 15c and the open centers 15d of the molded projections are butted against each other. A small molded bulge 18 extends out from between the molded extension with a small protrusion at the end of the extension 16 and the top surface of the seat 10. An identical molded bulge 18 extends out from the opposite end between the molded groove with a small recess 17 and the top surface. This molded bulge 18 butts against each other when the seat is unfolded and locked into place as seen in FIG. 5, so a space will be left creating a no pinch space. FIG. 5 is a sectional side view of a portion of the seat 10 unfolded to show the friction fit locking method of the molded extension with a small protrusion at the end of the extension 16 locked into the molded groove with a small recess 17. The molded projections 15 are shown with the upper portion 11a of the leg assemblies inserted in the open center 15d and extending along the wall 15b and seated against the bottom surface of the seat 10. Small molded bulges 18 are shown butting against each other creating a no pinch space on the top surface when the seat 10 is unfolded and locked in a ridged position.

What is claimed is:

1. A portable folding toilet seat that is so ultra light weight and compactable, that it can be carried in a back pack, luggage compartment or other packable means for use in the wilderness areas or for overseas travel; comprising of a curved seat section with a top surface, a bottom surface, a back section, a front section and an open middle; the front section and the back section are connected by a molded center pivot axis, which allows the front and back sections to pivot open and closed; when the seat section folded joins the bottom surfaces of the front and back sections; the top surfaces of the front and back sections are facing in opposite directions and exposed outwardly; when fully closed, the seat has a clam shell appearance and two flat surfaces being exposed with the molded center pivot axis in between; extending from one surface on either side of the center pivot axis is a molded extension with a small protrusion at the end of the extension; on the opposing flat surface, a molded groove with a small recess receives the extension with the small protrusion with a snap fit locking the sections of the seat into a rigid position when the seat is fully opened.

2. The portable folding toilet seat of claim 1, wherein said bottom surface is comprised of an intricate series of supporting molded ribs giving the said curved seat section strength while reducing weight.

3. The portable folding toilet seat of claim 1, wherein said bottom surface with the intricate series of supporting molded ribs are partially carved out to form an interior storage space; the interior space is the full length of the retracted leg assembly and the width is just wide enough to allow for a friction fit or snap fit for storage of the leg assemblies on the bottom surface.

4. The portable folding toilet seat of claim 3, wherein said interior storage space of the partially carved out supporting molded ribs stores a plurality of leg assemblies; the carved out storage space forms a friction fit to allow the leg assemblies to snap into position to be stored; when the folding toilet seat is fully folded the leg assembly is nested in the friction fit interior storage space and only the clam shell appears.

5. The portable folding toilet seat of claim 1, wherein said bottom surface has a plurality of carved out interior spaces to allow a plurality of leg assemblies to friction fit into these interior spaces.

6. The portable folding toilet seat of claim 5; wherein the leg assemblies consist of two tubes that are able to fully retract to be stored in the interior space; the leg assembly then is able to be snapped out of the friction fit interior space to be extended to a height for child use or fully extended for adult use.

7. The portable folding toilet seat of claim 1, wherein said bottom surface has a plurality of molded projections extending from the bottom surface; the molded projections consisting of a base, a wall, a lip and an open center; the molded projection is broader at the base and taper as the wall extends to the lip which is thinner.

8. The portable folding toilet seat of claim 1, wherein said bottom surface containing the molded projections consisting of a base, a wall a lip and an open center; the wall is of sufficient length and the open center is of sufficient width to create a receptacle to receive the end of the leg assembly; the upper end of the leg assembly friction fits into the open center and be supported by the wall of the molded projection; once all of the leg assemblies are friction fitted in the openings and supported by the wall, the portable folding toilet seat is supported to be a stand alone portable toilet.

* * * * *